US010129312B2

(12) United States Patent
Spears et al.

(10) Patent No.: US 10,129,312 B2
(45) Date of Patent: Nov. 13, 2018

(54) DYNAMIC VIDEO STREAMING BASED ON VIEWER ACTIVITY

(71) Applicant: MICROSOFT TECHNOLOGY LICENSING, LLC, Redmond, WA (US)

(72) Inventors: Stacey L. Spears, Sammamish, WA (US); Haoyun Wu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 34 days.

(21) Appl. No.: 14/483,976

(22) Filed: Sep. 11, 2014

(65) Prior Publication Data

US 2016/0080448 A1    Mar. 17, 2016

(51) Int. Cl.
*H04L 29/06* (2006.01)
*H04L 29/08* (2006.01)
(Continued)

(52) U.S. Cl.
CPC ........ *H04L 65/602* (2013.01); *H04L 65/4092* (2013.01); *H04L 65/80* (2013.01);
(Continued)

(58) Field of Classification Search
CPC ........... A61B 3/032; A61B 3/14; A61B 3/113; A61B 5/1034; A61B 5/6898; G06F 19/3406; G06F 19/3418; G06F 19/3437; G06F 19/3443; G06F 19/345; G06F 3/14; G09G 2340/0407; G09G 2354/00;
(Continued)

(56) References Cited

U.S. PATENT DOCUMENTS

| 6,078,349 A * | 6/2000 | Molloy | G06F 3/0481 348/14.07 |
| 6,513,931 B1 * | 2/2003 | Torrey | A61B 3/032 351/243 |

(Continued)

FOREIGN PATENT DOCUMENTS

| EP | 1843592 A1 | 10/2007 |
| WO | WO2010059262 A1 | 5/2010 |

OTHER PUBLICATIONS

PCT Search Report & Written Opinion for Application No. PCT/US2015/049533, dated Dec. 4, 2015, 10 pages.
(Continued)

*Primary Examiner* — Greg C Bengzon
(74) *Attorney, Agent, or Firm* — Newport IP, LLC; Jacob P. Rohwer

(57) ABSTRACT

In some examples, techniques and architectures for modifying resolution of video displayed on a display device include receiving information from a distance sensor and one or more image sensors, detecting an activity of a viewer of the display device based, at least in part, on the information received from the distance sensor and the one or more image sensors, and transmitting a request to a remote server to adjust bandwidth of media content streaming to the display device to a new bandwidth. The new bandwidth may be based, at least in part, on one or more of the activity of the viewer, size of the display device, or an ability of the viewer to resolve images displayed on the display device.

19 Claims, 5 Drawing Sheets

(51) Int. Cl.
*H04N 21/4223* (2011.01)
*H04N 21/442* (2011.01)
*H04N 21/6379* (2011.01)

(52) U.S. Cl.
CPC ............ *H04L 67/22* (2013.01); *H04L 67/24* (2013.01); *H04N 21/4223* (2013.01); *H04N 21/44213* (2013.01); *H04N 21/44218* (2013.01); *H04N 21/6379* (2013.01)

(58) Field of Classification Search
CPC ............... G09G 5/00; H04N 21/44213; H04N 21/44218; H04N 21/816; H04N 21/6587; H04N 21/2343; H04N 21/234336; H04N 21/234345; H04N 21/23439; H04N 21/251; H04N 21/258; H04N 21/252; H04N 21/2662; H04N 21/4415; H04N 21/4532; H04N 21/4223; H04N 21/637; H04N 21/6371; H04N 21/6373; H04N 21/6377; H04N 21/6379; H04N 21/64769; H04N 21/6582; H04H 60/33; H04H 60/46; H04L 65/4092; H04L 65/602; H04L 65/605; H04L 65/80; H04L 67/22; H04L 67/24; H04L 65/4069; H04L 67/10; H04L 67/2847; H04L 67/303; H04L 67/306; A63F 13/30; A63F 13/355; A63F 13/60; A63F 13/77

See application file for complete search history.

(56) References Cited

U.S. PATENT DOCUMENTS

| | | | | |
|---|---|---|---|---|
| 6,959,450 B1 * | 10/2005 | Ritter | ............... | H04N 7/17318 348/103 |
| 9,177,355 B1 * | 11/2015 | Buchheit | ............... | G09G 5/00 |
| 9,659,351 B2 * | 5/2017 | Aliaga | ............... | G06T 5/001 |
| 2003/0052911 A1 * | 3/2003 | Cohen-solal | ...... | H04L 29/06027 715/738 |
| 2003/0065803 A1 * | 4/2003 | Heuvelman | ...... | H04N 21/25808 709/231 |
| 2006/0023122 A1 * | 2/2006 | Fujii | ............... | H04N 5/14 348/561 |
| 2007/0245373 A1 * | 10/2007 | Shivaji-Rao | ............ | H04H 40/18 725/35 |
| 2007/0271518 A1 * | 11/2007 | Tischer | ............... | H04H 60/31 715/744 |
| 2010/0250765 A1 * | 9/2010 | Riggert | ............ | H04N 21/234363 709/231 |
| 2010/0250766 A1 * | 9/2010 | Riggert | ............ | H04N 21/234318 709/231 |
| 2010/0251293 A1 * | 9/2010 | Riggert | ............... | H04N 5/58 725/37 |
| 2011/0050656 A1 * | 3/2011 | Sakata | ............... | G06F 3/011 345/204 |
| 2011/0148930 A1 | 6/2011 | Lee et al. | | |
| 2011/0211114 A1 | 9/2011 | Cooper | | |
| 2011/0305375 A1 * | 12/2011 | Nelson | ............... | G06F 3/005 382/118 |
| 2012/0001932 A1 * | 1/2012 | Burnett | ............... | G06F 3/14 345/589 |
| 2012/0262477 A1 * | 10/2012 | Buchheit | ............... | G09G 5/00 345/619 |
| 2013/0002722 A1 * | 1/2013 | Krimon | ............... | G09G 5/22 345/661 |
| 2013/0103849 A1 * | 4/2013 | Mao | ............... | H04N 21/8456 709/231 |
| 2013/0125155 A1 | 5/2013 | Bhagavathy et al. | | |
| 2013/0127821 A1 * | 5/2013 | Lewis | ............... | G06T 11/00 345/418 |
| 2013/0141697 A1 * | 6/2013 | Berry | ............... | A61B 3/18 351/223 |
| 2013/0156407 A1 * | 6/2013 | Seok | ............... | H04N 5/76 386/343 |
| 2013/0195204 A1 * | 8/2013 | Reznik | ............... | H04N 19/85 375/240.26 |
| 2013/0242187 A1 * | 9/2013 | Noda | ............... | G09G 3/3611 348/441 |
| 2013/0250086 A1 * | 9/2013 | Mar | ............... | G02B 27/0093 348/78 |
| 2013/0290993 A1 | 10/2013 | Cheung et al. | | |
| 2013/0329781 A1 * | 12/2013 | Su | ............... | H04N 21/23424 375/240.02 |
| 2014/0012978 A1 * | 1/2014 | Moussavian | ........... | G06Q 50/20 709/224 |
| 2014/0047464 A1 * | 2/2014 | Lev | ............... | H04N 21/4223 725/12 |
| 2014/0118240 A1 | 5/2014 | Pais | | |
| 2014/0118354 A1 * | 5/2014 | Pais | ............... | G09G 5/373 345/428 |
| 2014/0118392 A1 * | 5/2014 | Tran | ............... | G09G 5/00 345/619 |
| 2014/0137054 A1 * | 5/2014 | Gandhi | ............... | G06F 3/013 715/865 |
| 2014/0181850 A1 * | 6/2014 | Weaver | ............... | H04N 7/17318 725/14 |
| 2014/0207950 A1 * | 7/2014 | Badiee | ............... | H04L 43/08 709/224 |
| 2014/0237079 A1 * | 8/2014 | Lockerbie | ............ | H04N 21/2146 709/218 |
| 2014/0313129 A1 * | 10/2014 | Elvesjo | ............... | G06F 1/3287 345/156 |
| 2014/0356848 A1 * | 12/2014 | Peterson | ............... | G06F 3/0482 434/428 |
| 2015/0015666 A1 * | 1/2015 | Kwon | ............... | H04N 21/816 348/43 |
| 2015/0109577 A1 * | 4/2015 | Haddadi | ............... | A61B 3/11 351/204 |
| 2015/0110469 A1 * | 4/2015 | Ushiyama | ........... | H04N 21/2662 386/241 |
| 2015/0113582 A1 * | 4/2015 | Ushiyama | ........... | H04N 21/2662 725/115 |
| 2015/0179149 A1 * | 6/2015 | Park | ............... | G06F 3/013 345/698 |
| 2015/0257967 A1 * | 9/2015 | Simmons | ............... | G16H 50/30 351/202 |
| 2015/0269434 A1 * | 9/2015 | Aliaga | ............... | G06T 5/001 382/114 |
| 2015/0341411 A1 * | 11/2015 | Huber | ............... | H04L 65/4092 709/231 |
| 2016/0043964 A1 * | 2/2016 | Weaver | ............... | H04N 7/17318 709/226 |
| 2016/0078594 A1 * | 3/2016 | Scherlen | ............... | G09G 5/00 345/428 |
| 2016/0080448 A1 * | 3/2016 | Spears | ............... | H04L 65/602 709/219 |
| 2016/0219248 A1 * | 7/2016 | Reznik | ............... | H04N 21/2343 |
| 2016/0271002 A9 * | 9/2016 | Simmons | ............... | G16H 50/30 |
| 2016/0330084 A1 * | 11/2016 | Hunter | ............... | H04L 43/08 |

OTHER PUBLICATIONS

Bale, Carlton, "1080p Does Matter—Here's When (Screen Size vs. Viewing Distance vs. Resolution)", retrieved on Aug. 1, 2014, available at <<http://carltonbale.com/1080p-does-matter/>>, CarltonBale.com, Nov. 18, 2009, 18 pages.

Burns, Matt "1080p charted: Viewing distance ot screen size", retrieved on Aug. 1, 2014 at <<http://www.engadget.com/2006/12/09/1080p-charted-viewing-distance-to-screen-size/>>, Engadget Newsletter, AOL Inc., Dec. 9, 2006, 3 pages.

eBay.com, "How to Equate Viewing Distance ot Screen Size When Considering a New Flat-Screen", retrieved on Aug. 1, 2014, available at <<http://www.ebay.com/gds/TV-Viewing-Distance-and ScreenSize/10000000177630637/g.html>>, eBay.com, Aug. 20, 2013, 7 pages.

(56) References Cited

OTHER PUBLICATIONS

PCT Written Opinion of the International Preliminary Examining Authority dated May 6, 2016, for PCT application No. PCT/US2015/049533, 5 pages.
"International Preliminary Report on Patentability Issued in PCT Application No. PCT/US2015/049533", dated Nov. 22, 2016, 6 Pages.
"Office Action Issued in European Patent Application No. 15770725.8", dated May 22, 2018, 4 Pages.

* cited by examiner

| Viewer | Gesture | Attention Value | Distance | Visual Acuity | Index |
|---|---|---|---|---|---|
| 1 | Viewing | 5 | 12 | 5 | 5 |
| 2 | Reading | 1 | 14 | 3 | 2 |
| 3 | Sleeping | 0 | 6 | 4 | 0 |
| 4 | Viewing | 4 | 12 | 3 | 4 |
| 5 | Talking | 2 | 22 | 1 | 1 |

DYNAMIC VIDEO STREAMING BASED ON VIEWER ACTIVITY

BACKGROUND

Network bandwidth associated with streaming media content can be limited and costly. Moreover, streaming media content within a home or other network with limited bandwidth may tax the performance of the network, especially if the media content is high definition video or ultra-high definition video. Limited bandwidth may lead to poor quality playback of the media content due to insufficient total available network bandwidth. Limited bandwidth may instead lead to acceptable quality media playback, but at the cost of reduced availability of the network for other purposes, such as additional media streaming.

In the case of video streaming, recent consumer demand for ever-higher resolution (e.g., "4k" or "2160p"), and consumer preference for non-interlaced rendering (e.g., 1080p is generally preferred over 1080i) may increase strain on communication networks having limited bandwidth. This problem can become more severe as technology advances, and consumers demand higher resolutions for video content.

SUMMARY

This disclosure describes techniques and architectures for using various distance and optical sensors to detect parameters of viewers of a display device and for dynamically adjusting bandwidth of streaming media content based, at least in part, on the parameters. Such parameters may include identities, locations, activities, or actions of viewers of the display device. For example, a computing system associated with a display device may determine the maximum resolution of the display device that a viewer can resolve using information gathered by the sensors. Such maximum resolution resolvable by a viewer may depend of the viewer's visual acuity and/or the viewer's distance from the display device. The computing system may compare the viewer's distance from the display device to the viewer's visual acuity, which may be determined from a look-up table, for example. The computing system may transmit requests to a remote server, from which streaming media content is received by the display device, to modify the bandwidth (and concomitant video resolution) of the streaming media content based, at least in part, on the determined maximum resolution that the viewer can resolve (and based, at least in part, on size of the display device).

In other examples, the computing system may transmit requests to the remote server to lower the bandwidth of the streaming media if the viewer has fallen asleep, is talking on a phone, or is otherwise not paying attention to the streaming media being displayed on the display device.

In still other examples, the computing system may transmit requests to a remote server to lower the bandwidth of the streaming media based, at least in part, on age of a viewer. For example, a relatively young viewer (e.g., less than about 6 years old) may not appreciate relatively high resolution of displayed content of the streaming media. Accordingly, such relatively high resolution may be "wasted" on the young viewer. Information regarding a viewer may include, among other things, age of the viewer. Such information may be retrieved from a memory.

In yet other examples, the computing system, which may be a mobile computing device (e.g., a Smartphone), may transmit requests to a remote server to lower the bandwidth of the streaming media based, at least in part, on whether the mobile computing device is placed in a pocket, purse, handbag, pack, and so on. For example, a viewer may be viewing a video that includes audio on a mobile computing device. Such a video may be a music video or a class video, for example. The viewer may place the mobile computing device in a pocket or handbag, intending to only listen to the audio portion (e.g., and ignore the video portion) of the video. Thus, relatively high resolution of displayed content of streaming media for the video may be "wasted" while the mobile computing device is in a pocket or handbag and not being viewed by the viewer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The term "techniques," for instance, may refer to system(s), method(s), computer-readable instructions, module(s), algorithms, hardware logic (e.g., Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs)), and/or other technique(s) as permitted by the context above and throughout the document.

BRIEF DESCRIPTION OF THE DRAWINGS

The detailed description is set forth with reference to the accompanying figures. In the figures, the left-most digit of a reference number identifies the figure in which the reference number first appears. The use of the same reference numbers in different figures indicates similar or identical items or features.

DETAILED DESCRIPTION

Overview

Figure 1:
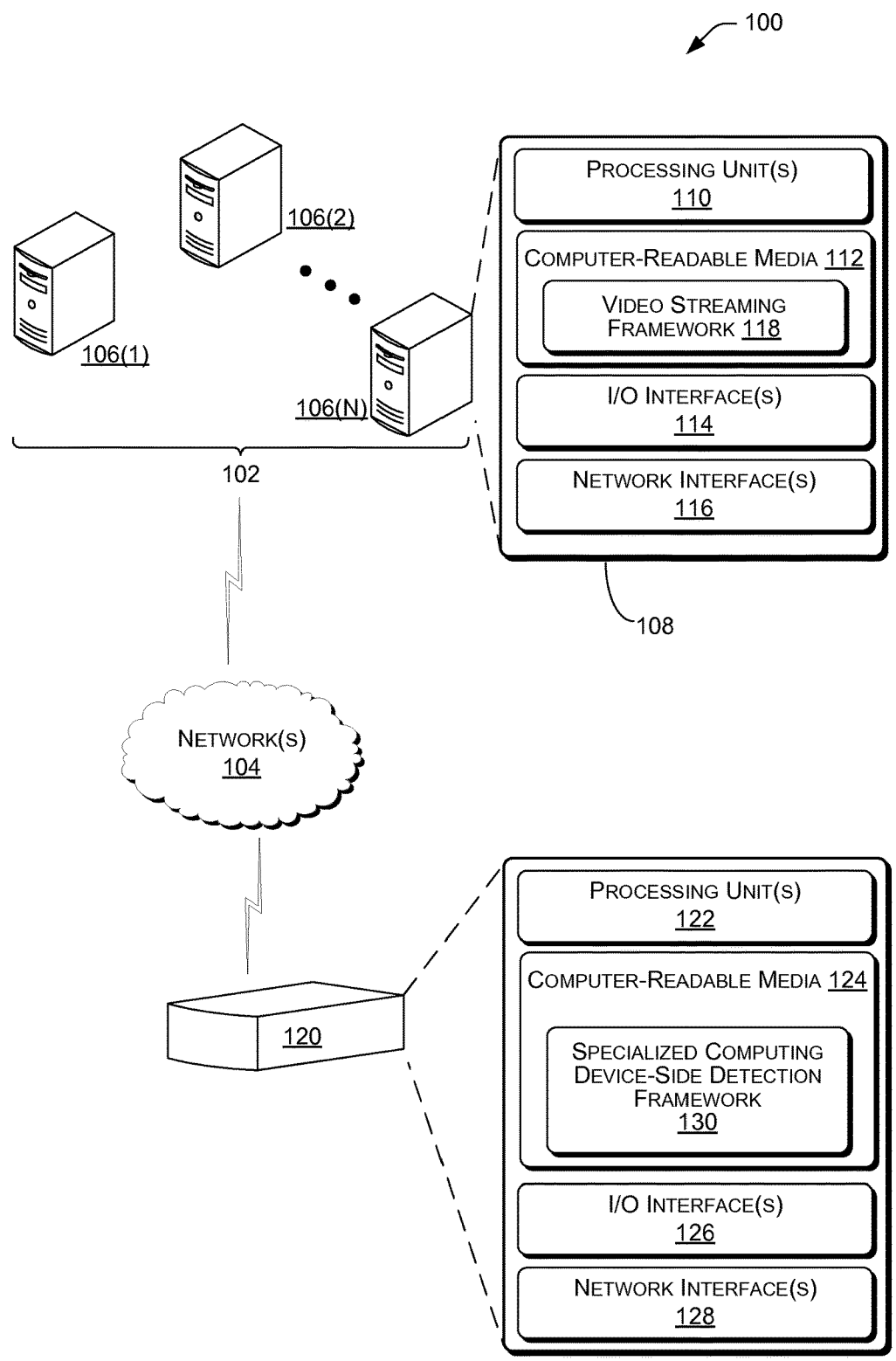
FIG. 1 is a block diagram depicting an environment for determining various parameters of one or more viewers of a display device and for modifying bandwidth of streaming media content, according to various embodiments.

In various embodiments, techniques and architectures are used to modify bandwidth of media content streaming to a display device. Such modifying may be based, at least in part, on a variety of behaviors, actions, and/or personal data of one or more viewers or viewers of a display device. Resolution of displayed video of the streaming media content may depend, at least in part, on bandwidth of the streaming media content. Generally, the higher the bandwidth, the higher the resolution that may be displayed on a display device.

Media content may comprise electronic signals that represent video, audio, images, and so on. A processor may render such electronic signals into displayed video, images, or audio. For example, a movie may be in the form of media content electronically communicated from a server (e.g., a processor in a network) to a client (e.g. a processor of an end-user) that converts the media content into video and audio signals. The video signals may be displayed on a display device and the audio signals may be provided to a speaker system.

Though relatively high video display resolution is desirable, the relatively higher bandwidth associated with such relatively high video display resolution may be costly. Moreover, there are a number of situations where relatively high video display resolution is "wasted" on a viewer of a display device. In other words, there are circumstances where lowering the video display resolution need not have a detrimental effect on the viewer's viewing experience. This may be the case, for example, if the viewer is relatively far from the display device and the viewer has relatively poor visual acuity. In another example, the viewer would not notice a lowered video display resolution if the viewer falls asleep while viewing video on the display device. In yet another example, the viewer may not notice a lowered video display resolution if the viewer is reading a book or magazine, texting on a mobile computing device, eating, or involved in some "multitasking" activity.

If resolution of video from streaming media content can be lowered without introducing an undesirable viewing experience to a viewer, then bandwidth of the streaming media content can also be lowered, leading to a number of benefits. For example, lowering bandwidth for a particular communication channel may allow for increased bandwidth in other communication channels in a same communication pipeline. Lowering bandwidth may also lead to reduced communication costs for a number of entities, such as the viewer, a provider of the streaming media content, and the provider of the communication channel used to stream the media content.

In some embodiments, a processor may detect an activity of a viewer of a display device based, at least in part, on information received from a distance sensor and one or more image sensors. Herein, an "activity" of a viewer includes any of a number of behaviors or actions of the viewer. For example, an activity of a viewer of a display device may include viewing the display device, sleeping, talking, eating, performing a task other than viewing the display device, viewing the display device from a particular distance, wearing corrective lenses, and so on.

The processor may generate and transmit a request to a remote server to adjust bandwidth of media content streaming to the display device to a new bandwidth. Such a remote server may be providing, at least in part, the media content, for example. The request may include a particular new bandwidth or bandwidth range or may include a request to raise or lower the bandwidth. The request for a new bandwidth, and/or the value of the new bandwidth may be based, at least in part, on the activity of the viewer, size of the display device, and an ability of the viewer to resolve images displayed on the display device. Such ability, for example, may depend, at least in part, on visual acuity of the viewer and/or viewing distance of the viewer. Herein, viewing distance is defined as the distance between a viewer and a display device. In some implementations, location of the eyes of the viewer is considered to define the location of the viewer with respect to the display device. Herein, a person in the vicinity of the display device is called a "viewer", whether or not the viewer is actually viewing the display device (e.g., a viewer may be sleeping).

Various embodiments are described further with reference to FIGS. 1-6.

Example Environment

FIG. 1 is a block diagram depicting an environment 100 for determining various parameters of one or more viewers of a display device and for modifying bandwidth of streaming media content, according to various embodiments. In some examples, the various devices and/or components of environment 100 include distributed computing resources 102 that may communicate with one another and with external devices via one or more networks 104.

For example, network(s) 104 may include public networks such as the Internet, private networks such as an institutional and/or personal intranet, or some combination of private and public networks. Network(s) 104 may also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 104 may utilize communications protocols, including packet-based and/or datagram-based protocols such as internet protocol (IP), transmission control protocol (TCP), user datagram protocol (UDP), or other types of protocols. Moreover, network(s) 104 may also include a number of devices that facilitate network communications and/or form a hardware basis for the networks, such as switches, routers, gateways, access points, firewalls, base stations, repeaters, backbone devices, and the like.

In some examples, network(s) 104 may further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 1302.11 standards (e.g., 1302.11g, 1302.11n, and so forth), and other standards.

In various examples, distributed computing resource(s) 102 includes computing devices such as devices 106(1)-106(N). Examples support scenarios where device(s) 106 may include one or more computing devices that operate in a cluster or other grouped configuration to share resources, balance load, increase performance, provide fail-over support or redundancy, or for other purposes. Although illustrated as servers, device(s) 106 may include a diverse variety of device types and are not limited to any particular type of device. Device(s) 106 may include specialized computing device(s) 108.

For example, device(s) 106 may include any type of computing device having one or more processing unit(s) 110 operably connected to computer-readable media 112, I/O interfaces(s) 114, and network interface(s) 116. Computer-readable media 112 may have a video streaming framework 118 stored thereon. For example, video streaming framework 118 may comprise computer-readable code that, when executed by processing unit(s) 110, receive and process requests from a client server, such as specialized computing device(s) 120. Specialized computing device(s) 120, which may communicate with device(s) 106 via networks(s) 104, may include any type of computing device having one or more processing unit(s) 122 operably connected to computer-readable media 124, I/O interface(s) 126, and network interface(s) 128. I/O interface(s) may include a display device. Computer-readable media 124 may have a specialized computing device-side detection framework 130 stored thereon. For example, detection framework 130 may comprise computer-readable code that, when executed by processing unit(s) 122, perform a detection operation. Detection operations may include, just naming a few examples, detection of activities of a viewer of a display device, distance between the viewer and the display device, facial recognition, and so on.

Figure 2:
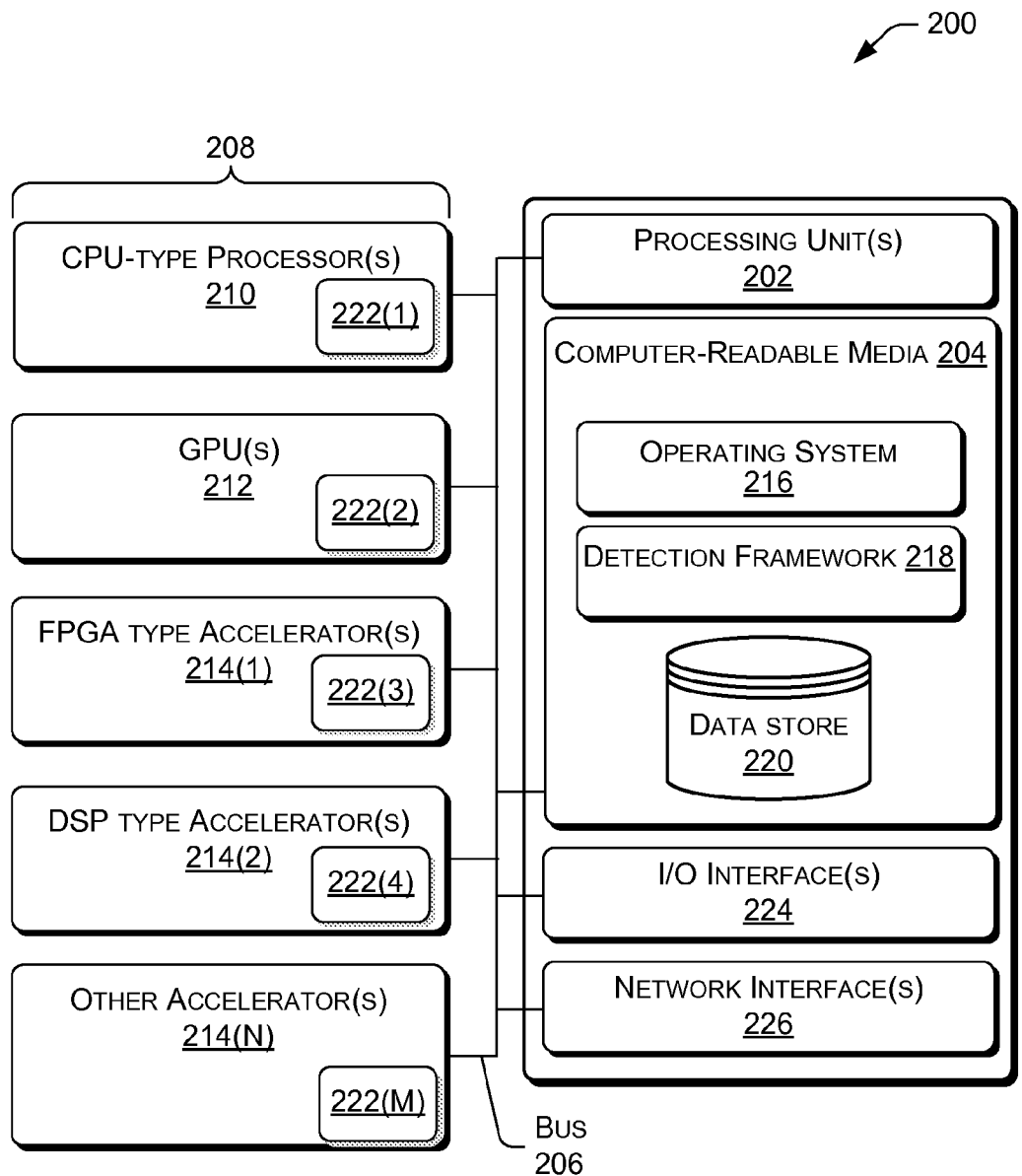
FIG. 2 is a block diagram depicting a device for determining various parameters of one or more viewers of a display device and for modifying bandwidth of streaming media content, according to various embodiments.

FIG. 2 depicts an illustrative device 200, which may represent device(s) 120, for example. Illustrative device 200 may include any type of computing device having one or more processing unit(s) 202, such as processing unit(s) 110 or 122, operably connected to computer-readable media 204, such as computer-readable media 112 or 124. The connection may be via a bus 206, which in some instances may include one or more of a system bus, a data bus, an address bus, a PCI bus, a Mini-PCI bus, and any variety of local, peripheral, and/or independent buses, or via another operable connection. Processing unit(s) 202 may represent, for example, a CPU incorporated in device 200. The processing unit(s) 202 may similarly be operably connected to computer-readable media 204.

The computer-readable media 204 may include, at least, two types of computer-readable media, namely computer storage media and communication media. Computer storage media may include volatile and non-volatile machine-readable, removable, and non-removable media implemented in any method or technology for storage of information (in compressed or uncompressed form), such as computer (or other electronic device) readable instructions, data structures, program modules, or other data to perform processes or methods described herein. The computer-readable media 112 and the computer-readable media 124 are examples of computer storage media. Computer storage media include, but are not limited to hard drives, floppy diskettes, optical disks, CD-ROMs, DVDs, Blu-ray, read-only memories (ROMs), random access memories (RAMs), EPROMs, EEPROMs, flash memory, magnetic or optical cards, solid-state memory devices, or other types of media/machine-readable medium suitable for storing electronic instructions.

In contrast, communication media may embody computer-readable instructions, data structures, program modules, or other data in a modulated data signal, such as a carrier wave, or other transmission mechanism. As defined herein, computer storage media does not include communication media.

Device 200 may include, but is not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device such as one or more separate processor device(s) 208, such as CPU-type processors (e.g., micro-processors) 210, GPUs 212, or accelerator device(s) 214.

In some examples, as shown regarding device 200, computer-readable media 204 may store instructions executable by the processing unit(s) 202, which may represent a CPU incorporated in device 200. Computer-readable media 204 may also store instructions executable by an external CPU-type processor 210, executable by a GPU 212, and/or executable by an accelerator 214, such as an FPGA type accelerator 214(1), a DSP type accelerator 214(2), or any internal or external accelerator 214(N).

Executable instructions stored on computer-readable media 204 may include, for example, an operating system 216, a detection framework 218, and other modules, programs, or applications that may be loadable and executable by processing units(s) 202, and/or 210. For example, detection framework 218 may comprise computer-readable code that, when executed by processing unit(s) 202, perform detection operations. In some implementations, modules may include a detecting module to detect respective distances between a display device and two or more viewers of the display device based, at least in part, on information from the distance sensor and the one or more image sensors. A transmitting module may transmit a request to a remote server to adjust bandwidth of media content streaming to the display device to a new bandwidth, wherein the new bandwidth is based, at least in part, on size of the display device and an ability of at least one of the two or more viewers to resolve images displayed on the display device. An image generating module may generate a range image having pixel values that correspond to the respective distances from the display to the two or more viewers based, at least in part, on information from the distance sensor in combination with information from the one or more image sensors. An activity detecting module may detect activities of the two or more viewers based, at least in part, on information from the distance sensor and the one or more image sensors. A categorizing module may categorize the activities into individual groups based, at least in part, on activity type.

Alternatively, or in addition, the functionally described herein may be performed by one or more hardware logic components such as accelerators 214. For example, and without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, accelerator 214 (N) may represent a hybrid device, such as one that includes a CPU core embedded in an FPGA fabric.

In the illustrated example, computer-readable media 204 also includes a data store 220. In some examples, data store 220 includes data storage such as a database, data warehouse, or other type of structured or unstructured data storage. In some examples, data store 220 includes a relational database with one or more tables, indices, stored procedures, and so forth to enable data access. Data store 220 may store data for the operations of processes, applications, components, and/or modules stored in computer-readable media 204 and/or executed by processor(s) 202 and/or 210, and/or accelerator(s) 214. For example, data store 220 may store personal data pertaining to one or more viewers of a display device, though the viewers or other viewers may opt-out to prevent such personal data storage. Alternately, and with such an opt-out opportunity, some or all of the above-referenced data may be stored on separate memories 222 such as a memory 222(1) on board CPU type processor 210 (e.g., microprocessor(s)), memory 222(2) on board GPU 212, memory 222(3) on board FPGA type accelerator 214(1), memory 222(4) on board DSP type accelerator 214(2), and/or memory 222(M) on board another accelerator 214(N).

Device 200 may further include one or more input/output (I/O) interface(s) 224, such as I/O interface(s) 114 or 126, to allow device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). Device 200 may also include one or more network interface(s) 226, such as network interface(s) 116 or 128, to enable communications between computing device 200 and other networked devices such as other device 120 over network(s) 104. Such network interface(s) 226 may include one or more network interface controllers (NICs) or other types of transceiver devices to send and receive communications over a network.

In some embodiments, Device 200 may comprise a distance sensor and one or more image sensors as part of detection framework 218. Computer-readable media 204 may include modules such as a detecting module and a transmitting module. For example, detecting module may be able to detect respective distances between a display device and two or more viewers of the display device based, at least in part, on information from the distance sensor and the one or more image sensors. The transmitting module may be able to transmit a request to a remote server to adjust bandwidth of media content streaming to the display device to a new bandwidth. The new bandwidth may be based, at least in part, on a size of the display device and a comparison between the respective distances between the display device and the two or more viewers and visual acuity of the two or more viewers.

Figures 3, 4:
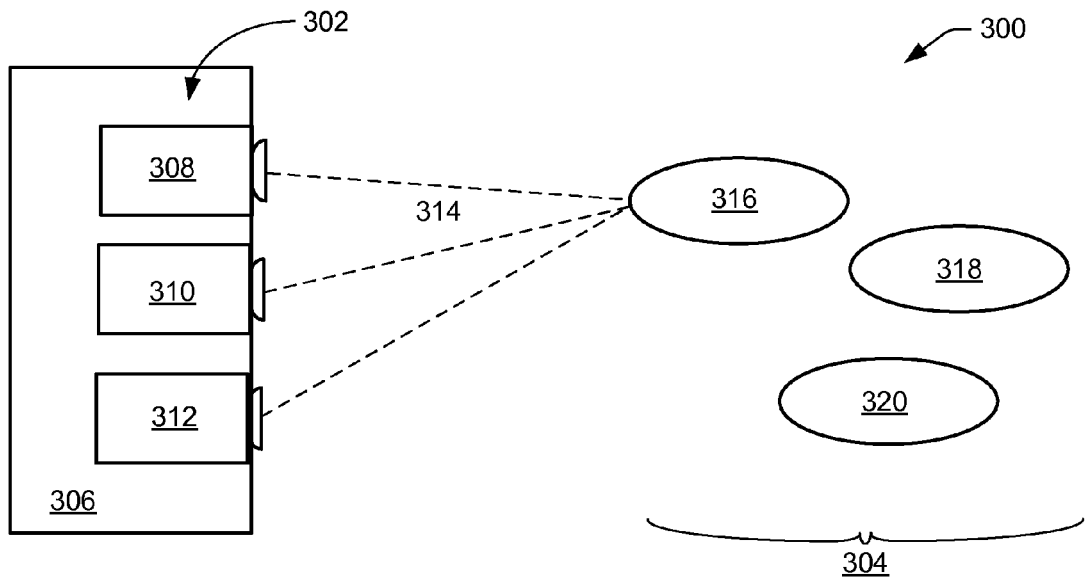
FIG. 3 is a schematic diagram depicting a set of detectors and various objects in a vicinity of the set of detectors, according to various embodiments.
FIG. 4 is a table of values associated with states of viewing of multiple viewers of a display device, according to various embodiments.

FIG. 3 is a schematic diagram depicting an environment 300 that includes a set of detectors 302 and various objects 304 in a vicinity of the set of detectors, according to various embodiments. Objects 304 may include any object detectable by detectors 302, such as people, objects worn or held by people, animals, furniture, wall partitions, and so on. Detectors 302 may provide information, wired or wirelessly, to a processor, such as computing device 200. The information provided by detectors 302, in combination with executable code, may allow the processor to detect characteristics or actions of a viewer. In some implementations, detectors 302 may include an infrared projector and camera and electronics that can provide information to the processor to track motion of objects 304 in three dimensions.

Detectors 302 may be mounted in a structure 306, such as an enclosure or frame, that may have an ability to rotate or pivot to enable a view of detectors 302 to change. The processor may be included in structure 306 or the processor may be located remotely from structure 306. Detectors 302 may include, among other things, one or more of a color (e.g., red-green-blue (RGB)) camera 308, depth sensor 310, and multi-array microphone 312, which may be used to perform acoustic source localization and ambient noise suppression, for example. The processor may detect, using information from detectors 302, full-body 3D motion capture, facial recognition, and voice recognition capabilities. Hereinafter, for sake of convenience, such a combination of a processor (or multiple processors) and detectors is called a "detector system".

In some implementations, depth sensor 310 comprises an infrared laser projector combined with a monochrome CMOS sensor, which is capable of capturing video data in 3D under any of a number of ambient light conditions. The sensing range of depth sensor 310 may be adjustable. The processor may be capable of automatically calibrating depth sensor 310 based, at least in part, on actions or activities of a viewer and the viewer's physical environment, accommodating for presence of furniture or other obstacles, for example.

In some particular implementations, color camera(s) 308 may produce video output having a frame rate in the range of about 9 to 30 Hertz, depending, at least in part, on resolution of the video output. The video output may comprise an RGB video stream having an 8-bit VGA resolution (640×480 pixels) with a Bayer color filter, though the video output may have higher resolutions (e.g., 1280×1024 pixels) with various frame rates. Video output may also include color formats other than RGB such as, for example YUV, which is a color space taking human visual perception into account. YUV may allow for reduced bandwidth for chrominance components so that transmission errors or compression artifacts may be at least partially masked by human visual perception as compared to the case for stand-alone RGB-representation. For some particular examples, reducing the bandwidth may involve reducing chroma (e.g., Cb and Cr or U and V) by half horizontally. This is called 4:2:2. (Such reducing by half vertically is called 4:2:0. 4:4:4 indicates the three chroma being equal. The three numbers correspond to Y:Cb:Cr or Y:U:V.) Such details of video output of color camera(s) 308 are merely examples, and claimed subject matter is not limited in this respect.

In some implementations, depth sensor 310 may comprise a monochrome (e.g., infrared) camera. Output of depth sensor may comprise a video stream having, in a particular example, VGA resolution (640×480 pixels) with 11-bit depth, thus providing 2,048 levels of sensitivity, though claimed subject matter is not so limited. The detector system may utilize information (e.g., electrical signals) corresponding to a view captured by depth sensor 310. Such information may be converted into a depth map. In some implementations, however, such information may be directly provided from depth sensor 310 to the processor of the detector system as a video signal having a resolution of 640×480 pixels, 1280×1024 pixels, and so on, depending, at least in part, on a frame rate of the video signal.

The detector system may have a sensing/detecting range from a distance of about a meter to several meters or more. Such limits of the sensing/detecting range, however, are merely examples, and claimed subject matter is not limited in this respect. In some implementations, the detector system is capable of tracking objects that are within a distance of about ten or so meters from detectors 302, though greater distances may be realized, and claimed subject matter is not so limited. The detector system may have a capability of tracking object with a spatial resolution of about 1.0 millimeters per pixel of depth sensor 310 and/or color camera(s) 308.

Detectors 302, mounted in structure 306, may have an angular field of view for detection. In one particular example, such an angular field of view may have a range from about of 50 to 70 degrees horizontally and about 40 to 60 degrees vertically, though claimed subject matter is not limited in this respect. Structure 306 may include a motorized pivoting assembly (not shown) that allows structure 306 to tilt sensors 302 upward or downward by about 30 degrees or more.

In some implementations, multi-array microphone 312 may include a number of microphones. In a particular example, multi-array microphone 312 includes four microphones on individual channels for communication to remaining portions of the detector system. Each such channel may carry 16-bit audio at a sampling rate of 16 kHz, though such numbers are merely examples, and claimed subject matter is not so limited.

The detector system may perform, among other things, activity recognition, facial recognition, voice recognition, and object identification. In some implementations, the detector system may be capable of simultaneously tracking a plurality of people (e.g., viewers) and portions of the people (e.g., faces, fingers, hands, arms, legs, and so on).

The detector system may include a memory, such as data store 220 shown in FIG. 2. The memory may store information regarding viewers, such as history of behavior of individual viewers, physical parameters of the viewers (e.g., weight, height, facial characteristics, and so on). A viewer may have a choice as to whether or not to opt-out so that such details regarding the viewer are not stored in memory.

Detectors 302 may provide information to a processor to track multiple objects 304 even if a line of sight 314 between detectors 302 and any of the objects 304 is interrupted. For example, if a viewer 316 walks behind a large object 318, which may be a room partition or another viewer, line of sight 314 may be interrupted. The processor may interpolate motion of viewer 316 for portions of the motion of viewer 316 that are not in line of sight 314. As another example, viewer 316 may leave the vicinity of the display device and return after a few minutes. The processor may utilize information provided by detectors 302 and stored viewer information (e.g., history of viewer behavior, physical or facial characteristics, and so on) to track motion of viewer 316 even though line of sight 314 to this viewer was interrupted.

A detector system may be capable of detecting behaviors, actions, or activities of individual viewers, such as viewer 316 and a viewer 320. In some implementations, the detector system may be capable of detecting behaviors, actions, or activities of combinations of individual viewers. For example, the detector system may detect if viewer 316 and viewer 320 are conversing with one another. Such detections may be based, at least in part, on detecting speech (e.g., detecting an audio signal in combination with detecting mouth movement of a viewer) by the viewers.

FIG. 4 is an illustrative table 400 of example data associated with states of viewing of multiple viewers of a display device, according to various embodiments. Table 400 includes data for five viewers of a display device, but claimed subject matter is not limited to any particular number of viewers. For individual viewers, a detector system detects activity and distance of the viewer from the display device. In some situations, visual acuity may also be detected based, at least in part, on detection of corrective lenses being worn by a viewer. Otherwise, visual acuity may be determined by the detector system by identifying a viewer (e.g., facial recognition) and using a database of information about the viewer in a memory. In some implementations, a detector system may test visual acuity of a viewer to determine the ability of the viewer to resolve images displayed on the display device. For example, during a process of setting up or initializing the detector system, a Snellen-type of visual test pattern may be displayed on a display device to test visual acuity of a viewer. Results of such testing may be stored in a memory as personal data and/or history of the viewer. The viewer, however, may opt-out of such testing or data storage.

A request to a remote server to adjust bandwidth of media content streaming to the display device to a new bandwidth may be based, at least in part, on size of the display device and an ability of at least one of the viewers to resolve images displayed on the display device.

The detector system, using information from detectors such as 302 and using information stored in memory, may populate table 400 with values. The detector system may update values in table 400 periodically or from time to time. For example, the detector system may update table 400 every several seconds based, at least in part, on updated information provided by detectors 302.

A processor portion of the detector system may assign an "attention value" to a viewer, which is a numerical value or weight that corresponds to a detected activity of the viewer. For example, in table 400, a numerical scale from "0" to "5" may be assigned to a viewer based, at least in part, on an activity of the viewer. A value of "0" indicates that the viewer is not paying any attention to video being displayed on the display device. Such values may be provided by a look-up table that includes activity types and ranges of corresponding attentions values. For example, an activity "viewing" may correspond to a range of attention values from "3" to "5". The particular attention value may be selected based on factors other than activity. For example, an activity of viewer 1 is "viewing" and visual acuity of viewer 1 is a value of "5", which represents relatively good visual acuity. A resulting attention value for viewer 1 is "5". On the other hand, even though viewer 4 also has an activity of "viewing", the attention value of viewer 4 is a "4", which is lower than the attention value for viewer 1 because the visual acuity for viewer 4 is poor compared to the visual acuity of viewer 1. Both viewer 1 and viewer 4 are at the same viewing distance (e.g., 12 feet). All other values being the same, the attention value of viewer 4 may increase if viewer 4 moves closer to the display device. In another example, an attention value for viewer 4 may be lower than that of viewer 1 if viewer 4 is determined to be talking from time to time to another viewer. In this case, a history of behavior (e.g., over the last few minutes, hours, or longer) for viewer 4 may be used to determine such intermittent talking.

The processor portion of the detector system may generate a request to a remote server to change bandwidth of media content streaming to the display device. The processor may use values in Table 400 to determine whether bandwidth should increase, decrease, or to what value the bandwidth should be changed to. In detail, the processor determines by how much, if at all, the displayed video resolution should change. The processor may use a look-up table to determine what bandwidth corresponds to what resolution. Such determination may depend, at least in part, on display device size, the current resolution, and the new resolution, just to name a few examples. The determined bandwidth may be included in the request generated by the processor, which may subsequently transmit the request to the remote server.

In some implementations, table 400 includes an index value for the individual viewers. A mathematical or empirical relationship may be used to generate index values. For example, index I may be expressed in a relationship such as I=(K1*Attention Value)*(K2/Distance)*(K3*Visual Acuity), where K1, K2, and K3 are empirical factors that may be adjusted to account for any of a number of parameters of the viewers, the display device, and/or the viewing vicinity. An index of "5" may indicate that a viewer is paying high attention to video displayed on the display device, and a reduction in resolution of the video would most likely be noticed and undesirable. In this case, the processor need not request a lowered bandwidth for the media content that includes the video. On the other hand, an index of "0" may indicate that a viewer is paying no attention to the video, and a reduction in resolution of the video would most likely be unnoticed. In this case, the processor may likely request a lowered bandwidth for the media content that includes the video.

In some embodiments, a sleeping state of a viewer may be detected and a video portion of media content may be consequently discontinued, though the audio portion of the media content may continue. For example, viewer 3 is determined to be sleeping and thus has an index of "0", regardless of the viewing distance or visual acuity of viewer 3. To account for the possibility of a false-positive sleep detection, a prompt may be displayed on a display device confirming whether the viewer is asleep or not or whether the viewer wishes to have video continue to be displayed.

Values in table 400 may be particularly useful for determining whether, and by how much, to change resolution of video and bandwidth of media content that includes the video for a plurality of viewers. Such determination may be relatively complex because different viewers have different characteristics, activities, behaviors, and actions. For example, while one viewer (e.g., at a relatively far viewing distance and having poor visual acuity) may not notice a decrease in resolution of video displayed on a display device, another viewer (e.g., having excellent visual acuity and sitting close to the display device) may notice such resolution change. Accordingly, a processor may attempt to determine an "optimal" solution, based on any of a number of goals. For example, if a particular goal is to provide desirably high video resolution while disregarding costs of streaming such high resolution video, then the processor may select the video resolution based, at least in part, on the viewer having the highest attention value. For another example, if a particular goal is to provide merely acceptable video resolution while considering costs of streaming high resolution video, then the processor may select the video resolution based, at least in part, on the viewer having an attention value that is an average for all the viewers.

In some embodiments, a detector system may include a distance sensor and one or more image sensors, a display device, one or more processing units, and computer-readable media with modules. For example, a detecting module or detecting system may detect respective distances between the display device and two or more viewers of the display device based, at least in part, on information from the distance sensor and the one or more image sensors. Such detected distances may be used to populate table 400, for example. A transmitting module may transmit a request to a remote server to adjust bandwidth of media content streaming to the display device to a new bandwidth. The new bandwidth may be based, at least in part, on size of the display device and an ability of at least one of the two or more viewers to resolve images displayed on the display device. For example, such ability may depend, at least in part, on visual acuity and/or distance, as included in table 400. An image generating module may generate a range image having pixel values that correspond to the respective distances from the display to the two or more viewers based, at least in part, on information from the distance sensor in combination with information from the one or more image sensors. Table 400 may include such respective distances of a number of viewers. An activity detecting module may detect activities of the two or more viewers based, at least in part, on information from the distance sensor and the one or more image sensors. A categorizing module may categorize the activities into individual groups based, at least in part, on activity type. For example, such categories may be included in table 400, and include "viewing", "reading", "sleeping", "talking", and so on. In the particular example shown in table 400, viewers 1 and 4 are categorized into a group "viewing". In some implementations, a new bandwidth may be based, at least in part, on the number of the activities in the individual groups. In this case, for example, the number of "viewing" activities in the viewing group is two, which may carry more weight than other activity groups, such as "reading", "sleeping", or "talking", each of which only have one activity. In other words, when determining how to change resolution and bandwidth for a plurality of viewers, the processor may consider how many viewers are in activity groups so that the resolution will be desirable for the greatest number of viewers.

Figure 5:
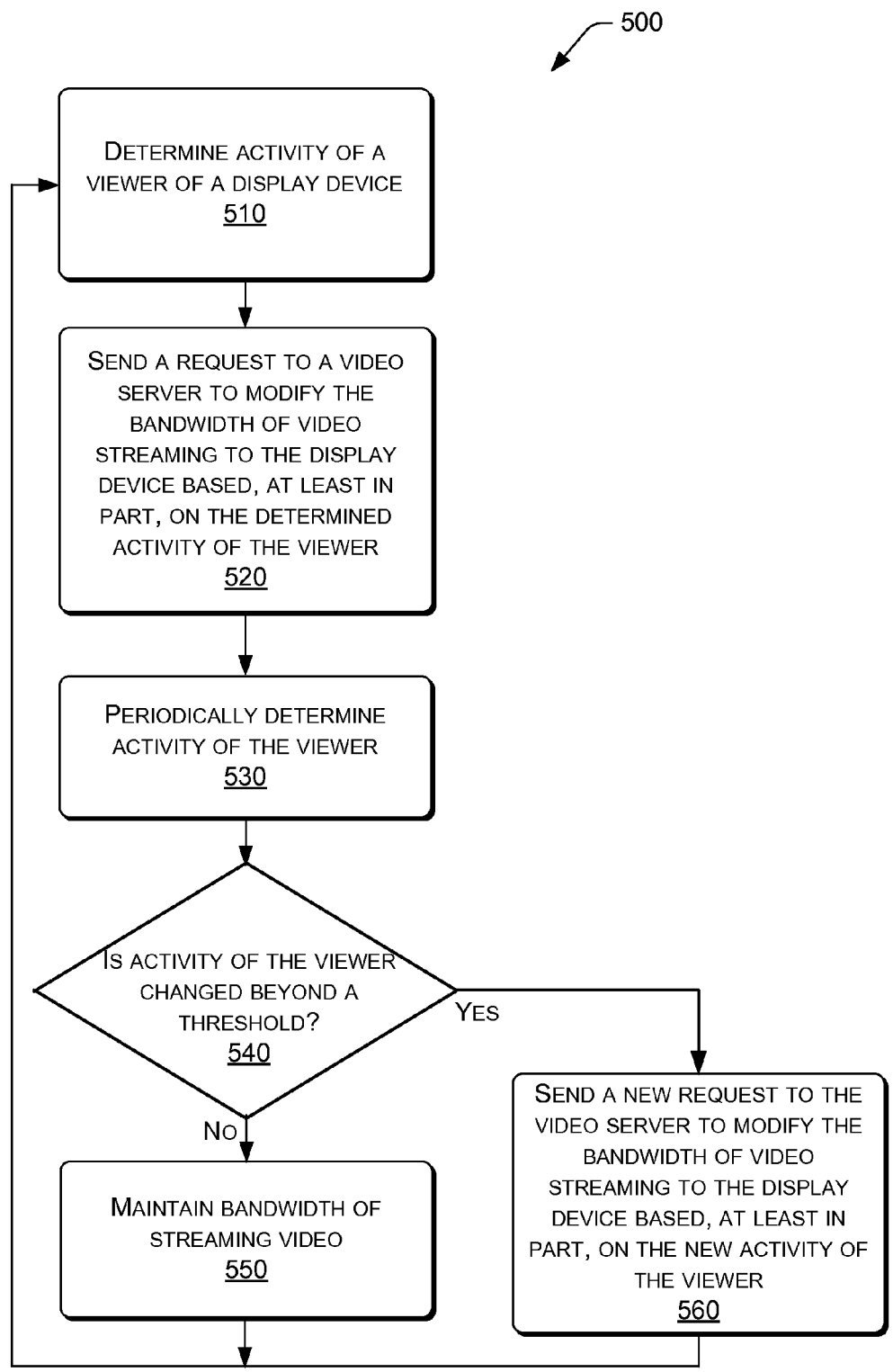
FIGS. 5 and 6 are flow diagrams illustrating processes for modifying bandwidth of streaming media content, according to some embodiments.
Figure 6:
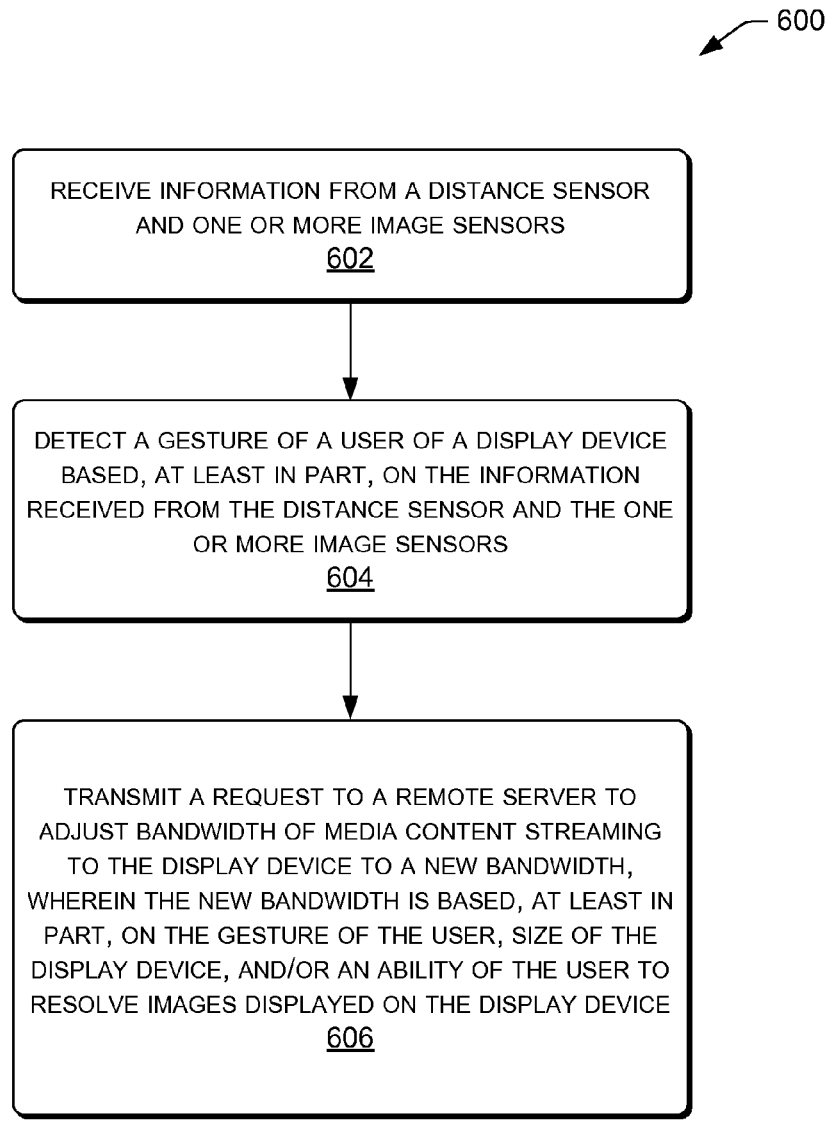

FIGS. 5 and 6 show illustrative processes that are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 5 is a flow diagram illustrating an illustrative process 500 for modifying bandwidth of streaming media content, according to some embodiments. Such modifying may be based, at least in part, on a variety of behaviors, actions, and/or personal data of one or more viewers or viewers of a display device. Resolution of displayed video of the streaming media content may depend, at least in part, on bandwidth of the streaming media content. Generally, the higher the bandwidth, the higher the resolution that may be displayed on a display device. A processor or computer system, such as device(s) 200 illustrated in FIG. 2 for example, may perform process 500.

At block 510, using information from sensors, detectors, or data stored in memory, for example, a processor may determine one or more activities or actions of a viewer of a display device. For example, such activities or actions may include viewing, reading, sleeping, talking, multitasking, and so on. In some implementations, the processor may determine a degree to which the viewer is engaged in such activities. For example, the processor may determine that the viewer is intermittently reading a magazine when glancing down to the magazine from viewing the display device. Accordingly, the viewer may be reading a particular portion of the time and viewing the display device the remaining portion of the time. Such portions may be used to quantify the degree to which the viewer is viewing the display device.

At block 520, the processor may generate and transmit a request to a server, which may be remote from the processor (e.g., located on a network) to modify the bandwidth of video streaming to the display device. The request for modifying the bandwidth may be based, at least in part, on the determined activity of the viewer. In some implementations, the processor may compare a history of behavior of the viewer with the activity or activity of the viewer. Such history for one or more individual viewers may be stored in memory (e.g., data store 220). Based, at least in part, on comparing the history with the activity or activity, the processor may delay generating or transmitting the request. For example, comparing the history of a viewer to a determination that the viewer is sleeping may reveal that the viewer tends to intermittently sleep or doze off for very short periods of time, perhaps seconds. Accordingly, based on such a revelation, the processor may delay a request to reduce the bandwidth (and video resolution) until the processor determines that the viewer has completely fallen asleep and will likely not be viewing displayed video.

In some implementations, the processor may simultaneously transmit the request to modify the bandwidth of video while the video is being displayed on the display device.

At block 530, the processor periodically or from time to time determines the activity of the viewer. Such periodicity, for example, may be seconds, minutes, or longer.

At block 540, the processor determines whether the activity of the viewer has changed beyond a threshold. For example, the viewer may move from ten feet away from the display device to 14 feet away from the display device. Based, at least in part, on visual acuity of the viewer, such a difference in viewing distance may not have an appreciable effect on the viewer's ability to view the display device. Accordingly, this change in viewer activity may be below a threshold. In this case, process 500 may proceed to block 550, where bandwidth is maintained at its current value (e.g., the processor does not send a request to change bandwidth). On the other hand, if the activity of the viewer changes beyond a threshold, then process 500 proceeds to block 560 where the processor may transmit a request to modify the bandwidth. For example, if the viewer moves from 14 feet to 20 feet away from the display device, then this difference in viewing distance may have an appreciable effect on the viewer's ability to view the display device. A reduced resolution may not be noticeable by the viewer.

FIG. 6 is a flow diagram illustrating an illustrative process 600 for modifying bandwidth of streaming media content, according to some embodiments. A processor or computer system, such as device(s) 200 illustrated in FIG. 2 for example, may perform process 600. At block 602, a processor may receive information from a distance sensor and one or more image sensors. Such sensors may be the same as or similar to sensors 302 illustrated in FIG. 3, for example. At block 604, the processor may detect an activity of a viewer of a display device based, at least in part, on the information received from the distance sensor and the one or more image sensors. At block 606, the processor may transmit a request to a remote server to adjust bandwidth of media content streaming to the display device to a new bandwidth, wherein the new bandwidth is based, at least in part, on the activity of the viewer, size of the display device, and an ability of the viewer to resolve images displayed on the display device.

Example Clauses

A. A method comprising: receiving distance information from a distance sensor and image information from one or more image sensors; detecting an activity of a viewer of a display device based, at least in part, on the image information received from the one or more image sensors; determining a distance between the viewer and the display device based, at least in part, on the distance information; and transmitting a request to a remote server to adjust bandwidth of media content streaming to the display device to a new bandwidth, wherein the new bandwidth is based, at least in part, on one or more of the activity of the viewer, size of the display device, or the distance between the viewer and the display device.

B. A method as paragraph A recites, further comprising comparing a distance between the viewer and the display device and a visual acuity of the viewer to determine an ability of the viewer to resolve images displayed on the display device.

C. A method as paragraph A or B recites, wherein the activity of the viewer comprises sleeping.

D. A method as paragraph C recites, further comprising instructing the display device to display a prompt that allows the viewer to override the request to the remote server.

E. A method as any one of paragraphs A-D recites, wherein the activity of the viewer comprises moving from a first viewing distance to a second viewing distance.

F. A method as paragraph E recites, further comprising: comparing a history of behavior of the viewer with the activity of the viewer; and delaying the request to the remote server based, at least in part, on the comparing.

G. A method as any one of paragraphs A-F recites, further comprising: testing visual acuity of the viewer to determine the ability of the viewer to resolve images displayed on the display device, wherein the new bandwidth is further based, at least in part, on results of the visual acuity of the viewer.

H. A method as any one of paragraphs A-G recites further comprising: detecting whether the viewer is wearing corrective lenses by using the one or more image sensors, wherein the new bandwidth is further based, at least in part, on results of the detecting.

I. A method as any one of paragraphs A-H recites, wherein transmitting the request to the remote server is performed while the display device displays video.

J. A method as any one of paragraphs A-I recites, wherein transmitting the request to the remote server includes a request to the remote server to stream an audio portion of the media content without streaming a video portion of the media content.

K. A system comprising: a distance sensor and one or more image sensors; a display device; one or more processing units; and computer-readable media with modules thereon, the modules comprising: a detecting module to detect respective distances between the display device and two or more viewers of the display device based, at least in part, on information from the distance sensor and the one or more image sensors; and a transmitting module to transmit a request to a remote server to adjust bandwidth of media content streaming to the display device to a new bandwidth, wherein the new bandwidth is based, at least in part, on size of the display device and a comparison between the respective distances between the display device and the two or more viewers and visual acuity of the two or more viewers.

L. A system as paragraph K recites, wherein the modules further comprise an image generating module to generate a range image having pixel values that correspond to the respective distances from the display to the two or more viewers based, at least in part, on information from the distance sensor in combination with information from the one or more image sensors.

M. A system as paragraph K or L recites, wherein the modules further comprise: an activity detecting module to detect activities of the two or more viewers based, at least in part, on information from the distance sensor and the one or more image sensors; and a categorizing module to categorize the activities into individual groups based, at least in part, on activity type.

N. A system as any one of paragraphs K-M recites, wherein the new bandwidth is based, at least in part, on the number of the activities in the individual groups.

O. A system as any one of paragraphs K-N recites, wherein the activities of the two or more viewers comprise sleeping or talking.

P. One or more computer-readable media storing computer-executable instructions that, when executed on one or more processors, configure a computer to perform acts comprising: using distance information from a distance sensor to determine a distance between a viewer of a display device and the display device; using image information from one or more image sensors to detect an activity of the viewer of the display device; and generating a request for a remote server to adjust bandwidth of media content streaming to the display device to a new bandwidth, wherein the new bandwidth is based, at least in part, on the activity of the viewer, size of the display device, and the distance between the viewer and the display device.

Q. Computer-readable media as paragraph P recites, wherein the acts further comprise: determining a distance between the viewer and the display device using the information from the distance sensor, wherein the ability of the viewer to resolve images displayed on the display device is based, at least in part, on the distance between the viewer and the display device.

R. Computer-readable media as paragraph P or Q recites, wherein the acts further comprise: comparing a history of behavior of the viewer with the activity of the viewer; and modifying the request to the remote server based, at least in part, on the comparing.

S. Computer-readable media as paragraph R recites, wherein the activity of the viewer comprises talking.

T. Computer-readable media as any one of paragraphs P-S recites, wherein the request includes a request for the remote server to stream an audio portion of the media content without streaming a video portion of the media content.

CONCLUSION

Although the subject matter has been described in language specific to structural features and/or methodological acts, it is to be understood that the subject matter defined in the appended claims is not necessarily limited to the specific features or acts described. Rather, the specific features and steps are disclosed as example forms of implementing the claims.

All of the methods and processes described above may be embodied in, and fully automated via, software code modules executed by one or more general purpose computers or processors. The code modules may be stored in any type of computer-readable medium, computer storage medium, or other computer storage device. Some or all of the methods may alternatively be embodied in specialized computer hardware.

Conditional language such as, among others, "can," "could," "may" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   testing, by a detector system, visual acuity of a viewer of a display device, operably connected to the detector system, to determine an ability of the viewer to resolve images displayed on the display device;
   detecting, by the detector system, facial characteristics of the viewer;
   storing, in a memory device associated with the display device, the facial characteristics and visual acuity information resulting from the testing in association with a user identity of the viewer;
   upon the viewer returning to a vicinity of the display device, receiving distance information from a distance sensor, the distance information including a distance between the viewer at a viewing location and the display device to which media content is streaming;
   determining, based on a recognition of the facial characteristics, the user identity of the viewer of the display device, the user identity being identified from a plurality of user identities associated with viewers that have previously viewed the display device;
   accessing, from the memory device, the visual acuity information stored in association with the user identity;
   generating a value for the viewer based at least in part on the distance information and the visual acuity information, the value indicative of an ability of the viewer to notice a reduction in resolution of the media content streaming to the display device;
   determining a resolution based at least in part on the value; and
   transmitting a request to a remote server to adjust bandwidth of the media content streaming to the display device to a new bandwidth, wherein the new bandwidth is based, at least in part, on a size of the display device and the resolution.

2. The method of claim 1, further comprising instructing the display device to display a prompt that allows the viewer to override the request to the remote server.

3. The method of claim 1, further comprising:
   receiving image information from one or more image sensors; and
   detecting an activity of the viewer of the display device based, at least in part, on the image information received from the one or more image sensors, wherein the value is further generated based at least in part on the activity.

4. The method of claim 3, further comprising:
   comparing a history of behavior of the viewer with the activity of the viewer; and
   delaying the request to the remote server based, at least in part, on the comparing.

5. The method of claim 3, further comprising:
   detecting whether the viewer is wearing corrective lenses by using the one or more image sensors, wherein the new bandwidth is further based, at least in part, on results of the detecting.

6. The method of claim 1, wherein the value is generated using a mathematical relationship that comprises a plurality of adjustable factors to account for a plurality of different viewing parameters that includes at least the distance information, the visual acuity information, and user age information.

7. The method of claim 1, wherein the visual acuity information stored in association with the user identity is maintained in a look-up table.

8. The method of claim 1, wherein the testing the visual acuity of the viewer of the display device comprises displaying a Snellen-type visual test pattern for the viewer.

9. A system comprising:
a distance sensor;
a display device;
a detector operably connected to the display device;
one or more processing units; and
computer-readable media having instructions that, when executed by the one or more processing units, configure the one or more processing units to perform operations comprising:
testing, by the detector, visual acuity of a viewer of the display device to determine an ability of the viewer to resolve images displayed on the display device;
storing visual acuity information resulting from the testing in association with a user identity of the viewer;
detecting a distance between the display device and the viewer of the display device based, at least in part, on information from the distance sensor;
determining a user identity of the viewer, the user identity being identified from a plurality of user identities associated with viewers that have previously viewed the display device;
accessing visual acuity information associated with the user identity;
generating a value for the viewer based at least in part on the distance and the visual acuity information, the value indicative of an ability of the viewer to notice a reduction in resolution of media content streaming to the display device;
determining a resolution based at least in part on the value; and
transmitting a request to a remote server to adjust bandwidth of the media content streaming to the display device to a new bandwidth, wherein the new bandwidth is based, at least in part, on a size of the display device and the resolution.

10. The system of claim 9, wherein the operations further comprise:
detecting an activity of the viewer based, at least in part, on information from one or more image sensors, wherein the value is further generated based at least in part on the activity.

11. The system of claim 9, wherein the value is generated using a mathematical relationship that comprises a plurality of adjustable factors to account for a plurality of different viewing parameters that includes at least the distance, the visual acuity information, and user age information.

12. The system of claim 9, wherein the visual acuity information stored in association with the user identity are maintained in a look-up table.

13. A system comprising:
a display device;
a detector operably connected to the display device;
one or more processing units; and
one or more computer-readable media storing computer-executable instructions that, when executed by the one or more processing units, configure the one or more processing units to perform operations comprising:
testing, by the detector, visual acuity of a viewer of the display device to determine an ability of the viewer to resolve images displayed on the display device;
storing visual acuity information resulting from the testing in association with a user identity of the viewer for each of a plurality of user identities associated with viewers that have viewed the display device;
upon the viewer returning to a vicinity of the display device, using distance information from a distance sensor to determine a distance between the viewer of the display device and the display device;
determining the user identity of the viewer based on recognition data;
using image information from an image sensor to determine an activity of the viewer of the display device;
accessing the stored visual acuity information associated with the user identity;
generating a value for the viewer based at least in part on each of the distance, the visual acuity information, and the activity of the viewer, the value indicative of an ability of the viewer to notice a reduction in resolution of media content streaming to the display device;
determining a resolution based at least in part on the value; and
generating a request for transmission to a remote server, the request to adjust bandwidth of the media content streaming to the display device to a new bandwidth, wherein the new bandwidth is based, at least in part, on a size of the display device and the resolution.

14. The system of claim 13, wherein the operations further comprise:
comparing a history of behavior of the viewer with the activity of the viewer; and
modifying the request to the remote server based, at least in part, on the comparing.

15. The system of claim 13, wherein the value is generated using a mathematical relationship that comprises a plurality of adjustable factors to account for a plurality of different viewing parameters that includes each of the distance, the visual acuity information, and the activity of the viewer.

16. The system of claim 13, wherein the visual acuity information associated with the user identity is maintained in a look-up table.

17. The system of claim 13, wherein the activity of the viewer is associated with a category of activity, the operations further comprising:
determining a degree to which the viewer is engaged in the activity;
associating the degree to which the viewer is engaged in the activity with an attention value, wherein the value is generated based at least in part on the attention value.

18. The system of claim 17, wherein the category of activity is assigned to a range of attention values.

19. The system of claim 13, wherein the recognition data comprises facial characteristics and facial recognition is used to determine the user identity of the viewer.

* * * * *